Oct. 29, 1946.　　　M. H. JOHANSON ET AL　　　2,410,348
METHOD AND MACHINE FOR RELIEVING GEAR CUTTERS
Filed Dec. 23, 1943　　　9 Sheets-Sheet 5

Inventors
MAGNUS H. JOHANSON
By ERNEST WILDHABER

Attorney

Inventors
MAGNUS H. JOHANSON
By ERNEST WILDHABER
Attorney

Oct. 29, 1946.    M. H. JOHANSON ET AL    2,410,348
METHOD AND MACHINE FOR RELIEVING GEAR CUTTERS
Filed Dec. 23, 1943        9 Sheets-Sheet 8

Inventors
MAGNUS H. JOHANSON
ERNEST WILDHABER
By
Attorney

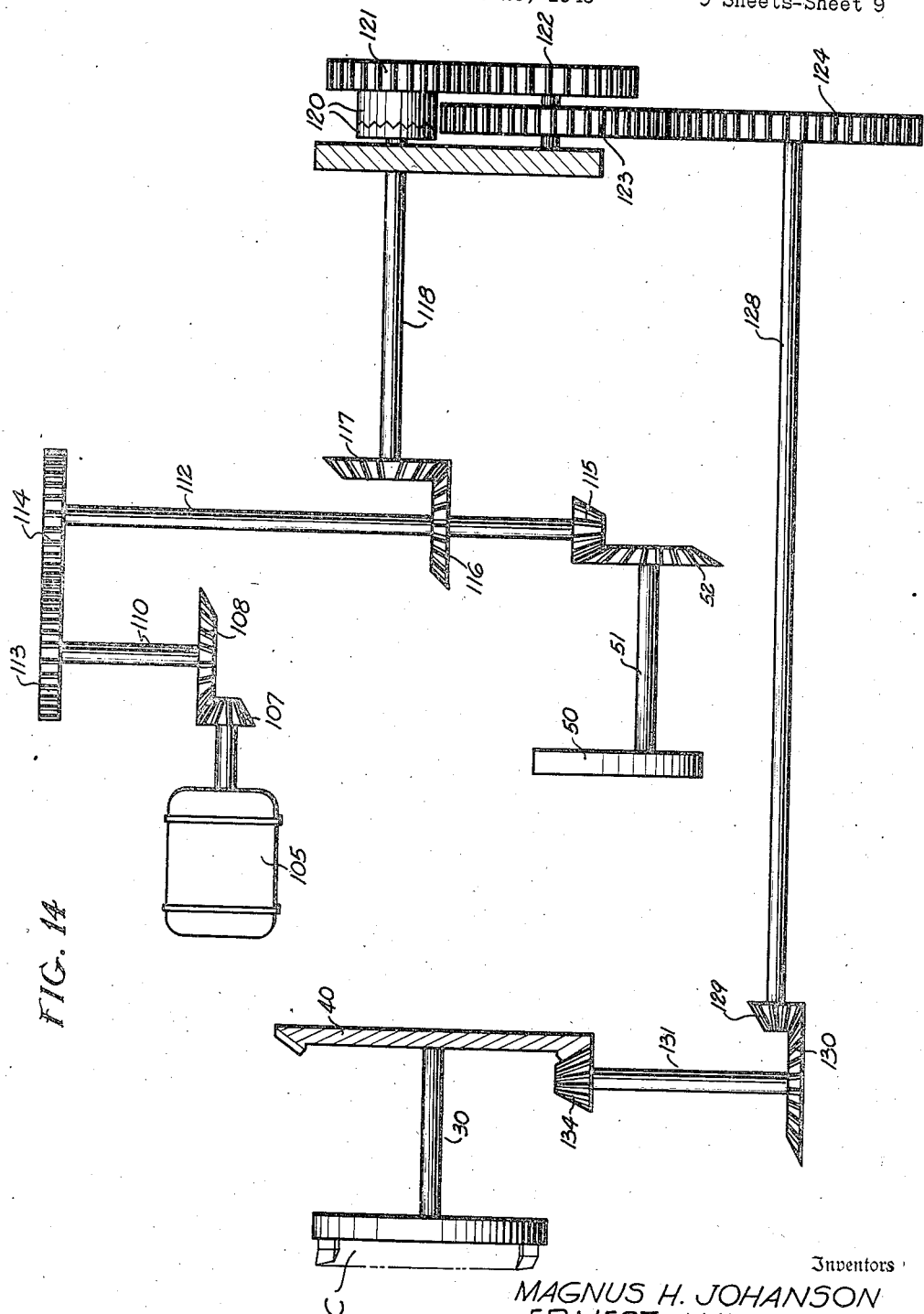

Patented Oct. 29, 1946

2,410,348

UNITED STATES PATENT OFFICE 2,410,348

METHOD AND MACHINE FOR RELIEVING GEAR CUTTERS

Magnus H. Johanson, Rochester, and Ernest Wildhaber, Brighton, N. Y., assignors to Gleason Works, Rochester, N. Y., a corporation of New York Application December 23, 1943, Serial No. 515,366

13 Claims. (Cl. 51—95)

1

The present invention relates to a method and machine for relieving cutting tools and particularly to a method and machine for relief-grinding face-mill gear cutters.

Usually, both the inside and the outside surfaces, as well as the tip surfaces, of face-mill gear cutter blades are relieved. In relief-grinding, ordinarily separate grinding wheels are employed for grinding the different blade-surfaces. The two wheels for grinding the side surfaces of the blades are adjusted angularly with reference to the cutter axis so that the wheels may produce the required pressure angles on the side surfaces of the blades, and usually the wheels are positioned to engage the blades at diametrically opposite points around the cutter periphery. The relief-grinding operation itself is effected by rotating the cutter and a wheel on their respective axes while effecting a relative reciprocatory movement between the wheel and cutter axially of the cutter in time with the cutter rotation and once for each blade to be relieved.

In the conventional type of face-mill gear-cutter relieving grinder, the two grinding wheels for grinding the side surfaces of the blades are mounted so that their axes are in the same (usually horizontal) plane as the axis of the cutter, and the wheels are adjusted radially in this plane to compensate for wheel wear. With this arrangement, the wheels contact with the side surfaces of the blades in lines which are offset from the common plane of cutter and wheel axes, and the offset is different for the inside and outside surfaces of the blades. The line of contact is above the common plane for one side of the blades and below the common plane for the other side. Moreover, the amount of offset of the lines of contact varies as the diameters of the grinding wheels decrease and the wheels are adjusted radially of the cutter axis to compensate for wear.

Because of the difference in offset of the lines of contact for opposite sides of the blades, the relative axial and rotational movements of the cutter and wheel along and about the cutter axis must be somewhat differently timed in the grinding of opposite sides of the blades; otherwise one side of the blades will not be relieved for their full length from front to rear, or in the grinding of one side of the blades, the wheel will not clear the blade, which it has just ground, quickly enough to avoid striking the next blade. Further than this, because the lines of contact are offset from the axial plane of the cutter, the angles between the wheel axes and the cutter axis have to be slightly different from the pressure angles

2 which it is desired to produce on the sides of the blades. Further still, because of the change in position of the line of contact as the grinding wheel wears down and its diameter decreases, the angle between the wheel and cutter axes must be changed, when the wheel is adjusted radially, in order to be able to continue to grind the same pressure angle on the side surfaces of the blades when the wheel is old as when the wheel is new. It is customary, therefore, in the conventional type of face-mill gear cutter relieving-grinder to finish-grind only one side surface of the cutter blades at a time and to change the angular position of the wheel and the timing of the relative rotational and axial movements of the cutter during the life of the wheel.

A primary object of the present invention is to provide a method and a machine for relief-grinding face-mill gear cutter blades in which the angular position of the wheel with reference to the cutter does not have to be changed as the diameter of the wheel decreases, but in which the same angular position may be used throughout the whole of the life of a wheel to grind side surfaces of a given pressure angle on the cutter.

Another object of the invention is to provide a method and machine for relief-grinding face-mill gear cutter blades in which the wheel axis may be inclined to the cutter axis at exactly the same angle as the pressure angle of the blade surface to be ground and no involved calculation of wheel setting is required.

Another object of the invention is to provide a method and machine for relief-grinding face-mill gear cutter blades in which the timing of the relative movements about and along the cutter axis may remain constant throughout the life of a grinding wheel and need not be changed with change in diameter of the wheel.

Still another object of the invention is to provide a method and machine for relief-grinding face-mill gear cutter blades in which the same timing of the relative movements about and in the direction of the cutter axis may be employed for the grinding of both inside and outside surfaces of the cutter blades.

A further object of the invention is to provide a method and machine for relief-grinding face-mill gear cutter blades in which the inside and outside surfaces of the blades may be relief-ground simultaneously.

Another object of the invention is to provide a machine in which the relief-grinding of a face-mill gear cutter may be effected more rapidly than on machines of previous design.

A further object of the invention is to provide a face-mill gear cutter relieving-grinder which will operate with extreme accuracy.

Another object of the invention is to provide a face-mill gear cutter relieving-grinder which can be adjusted quite simply to grind face-mill gear cutters of various types.

Still another object of the invention is to provide a relieving-grinder in which the axial relieving motion may be effected smoothly and in which any tendency to shock or vibration in the work drive is reduced to a minimum.

Other objects of the invention will be apparent hereinafter from the specification and from the recital of the appended claims.

In the drawings:

Fig. 14 is a drive diagram of the new machine.

Figure 1:
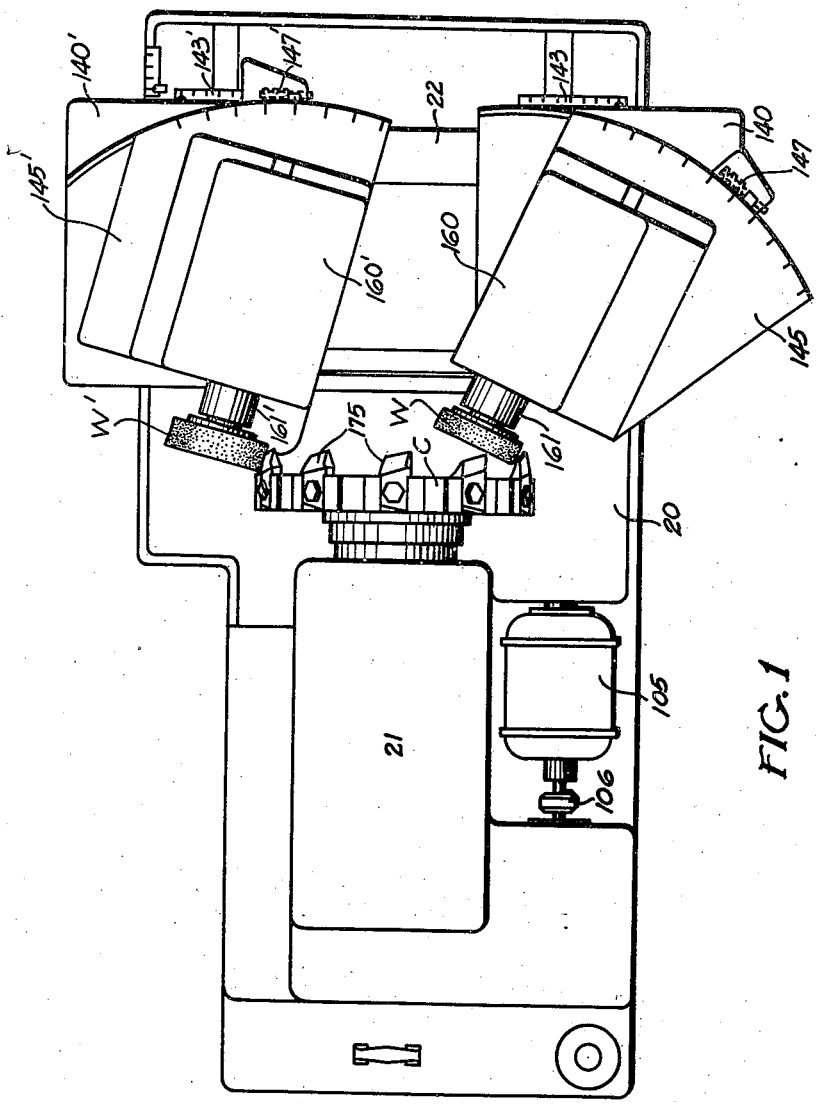
Fig. 1 is a plan view of a face-mill gear cutter relieving-grinder constructed according to a preferred embodiment of this invention.

With the method and machine of the present invention, the two grinding wheels for relieving the outside and inside surfaces, respectively, of the cutter are positioned initially so that the lines of contact between the wheels and the side surfaces of the blades to be ground lie in the same plane as the cutter axis. Further than this, the wheels are adjusted along the normals to the relieved side surfaces of the blades, as the diameters of the wheels decrease with wear. With this arrangement, the same timing of the relative rotary and axial movements about and along the cutter axis can be employed during the relieving of both sides of the cutter blades and, moreover, the timing can remain constant regardless of the diameters of the wheels. With this arrangement, also, a wheel can be inclined to the cutter axis at exactly the pressure angle of the blade surface to be relieved. Moreover, the angular inclination of the wheel to the cutter axis does not need to be changed as the wheel wears down; the same pressure angle can be produced on the cutter blades throughout the life of the wheel without any change in angular position of the wheel.

In a machine constructed according to the preferred embodiment of the invention, the axes of the work spindle and of the grinding wheels are in parallel horizontal planes. The grinding wheels are driven by separate motors and are mounted in separate wheel heads. Each of the wheel heads has the usual adjustments for positioning the wheel in accordance with the diameter of the cutter to be ground and the height of the cutter blades, and, in addition, it is carried by a rocker member which is adjustable angularly about an axis lying in the same plane as the axis of the work spindle of the machine. The rocker member is mounted on a support for adjustment radially of the work spindle and angularly about an axis extending perpendicular to the work spindle. The latter adjustment is for pressure angle setting of the wheel while the former adjustment serves with the angular adjustment of the rocker member to permit positioning of the wheel so that the line of contact between the wheel and the side surface of a cutter blade lies in the horizontal plane containing the work spindle axis and so that the line of contact may be maintained in such position throughout the life of the wheel.

The work spindle is mounted on anti-friction bearings for axial reciprocation in a sleeve which is journaled on anti-friction bearings in the work head. The reciprocatory movement of the spindle is produced by a disc cam of standard form which is shaped in the usual manner to effect a slow forward movement of the work spindle during the grinding of a blade and a quick return movement when the wheel has cleared the blade so as to return the cutter to initial position for the grinding of the next blade. The cam operates through a follower that is reciprocable in the work head.

This follower is engaged at one end with the disc cam, and may be engaged selectively at its other end with any one of a plurality of face cams or plates of different diameters and different contours that are secured to the work spindle. The face cams permit of modifying the motion produced by the disc cam so that the machine may be used by adjustment of the follower to grind different types of face mill cutters. The face cam or plate is held against the follower and the follower against the disc cam by a coil spring which is of such length that the power it exerts is substantially the same in all positions of axial movement of the spindle. This coil spring is mounted in a hole bored centrally in the work spindle so that it exerts a direct pressure on the follower and avoids any tendency toward canting.

The rotary motion of the work is obtained through a pair of hypoid gears which drive the sleeve in which the work spindle is mounted. These gears are connected through a train of gearing with the disc cam, so that cam and work spindle may be driven in timed relation. This train of gearing includes a set of change gears which permit of varying the timing of the rotational and axial movements of the work spindle for different diameters of cutters and for different numbers of blades in cutters.

Referring now to the drawings by numerals of reference, 20 denotes the base or frame of the machine. Mounted on this base or frame are the work head 21 (Fig. 4) and the slide 22 (Fig. 3) which carries the two grinding wheels W and W' for grinding the outside and inside surfaces, respectively, of the blades of the cutter which is to be relieved.

Mounted fixedly in the work head 21 is a bracket 24, and journaled in this bracket on anti-friction bearings 25, 26, and 27 is a sleeve 28. Mounted in the sleeve for axial reciprocation therein is the work spindle 30. This spindle is free to slide in the sleeve 28 and reciprocates on the antifriction bearings 31 and 32 which are carried in the work head 21. The spindle is formed with an enlarged head 34 which is formed in the usual manner with seats 35 and 36 which serve as supports for face-mill gear cutters of different diameters. The cutter C (Figs. 1 and 3), which is to be ground, is seated over the nose of the work spindle and is secured to the work spindle by bolts or screws 38.

The sleeve 28 is adapted to be rotated by a hypoid gear 40 (Figs. 4, 5, and 14) which is secured by screws 41 to a plate 42 that is keyed to the sleeve 28. The plate 42 is held against a shoulder formed on the sleeve by a nut 43 that threads on the sleeve. The rotation of the sleeve 28 is transmitted to the work spindle 30 through a key 45 (Fig. 5) which fits into a slot formed internally in the sleeve 28 and which is secured to the work spindle 30 by a screw 46.

Figure 4:
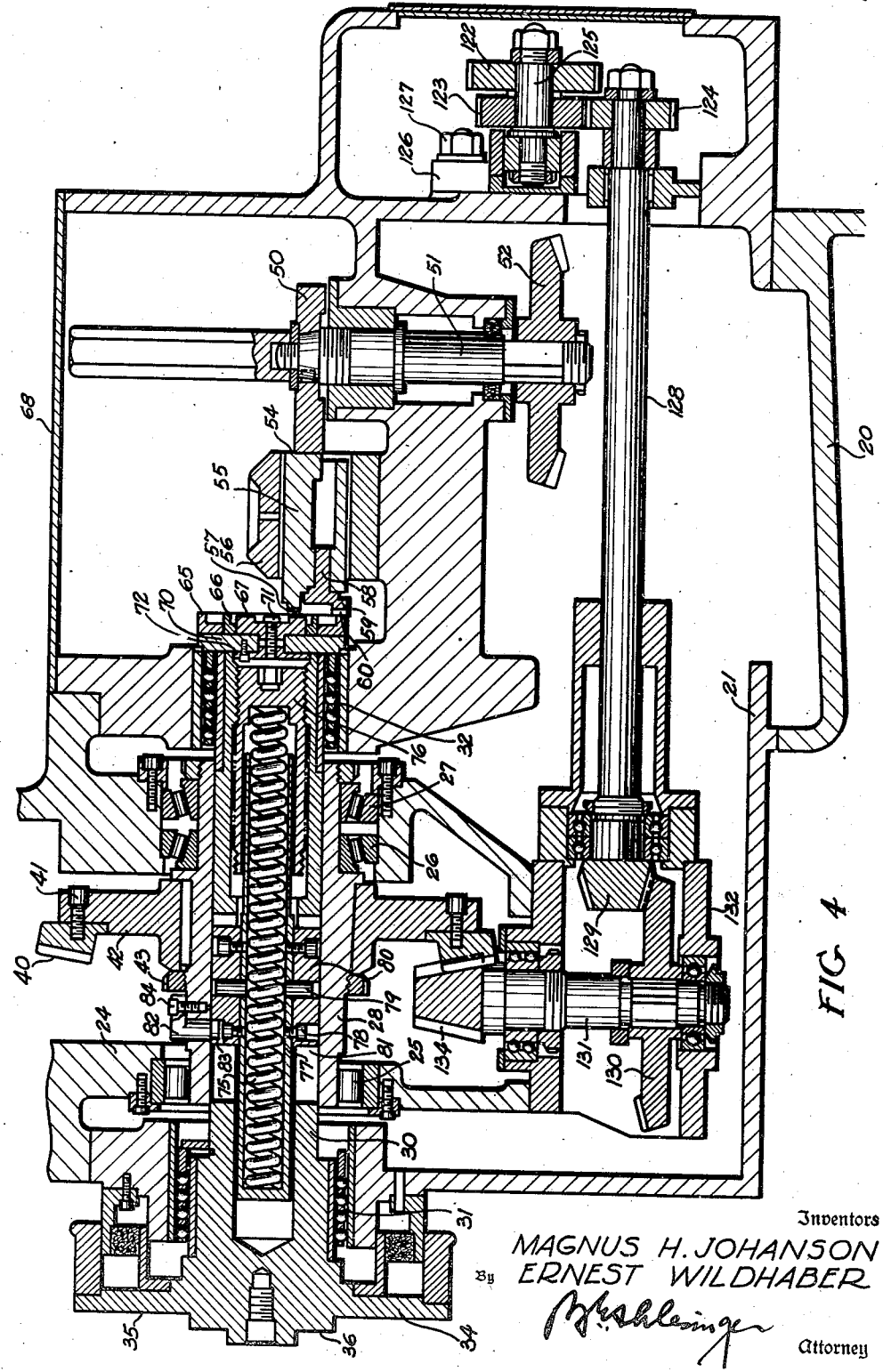
Fig. 4 is a longitudinal sectional view through the work head of the machine.
Figure 5:
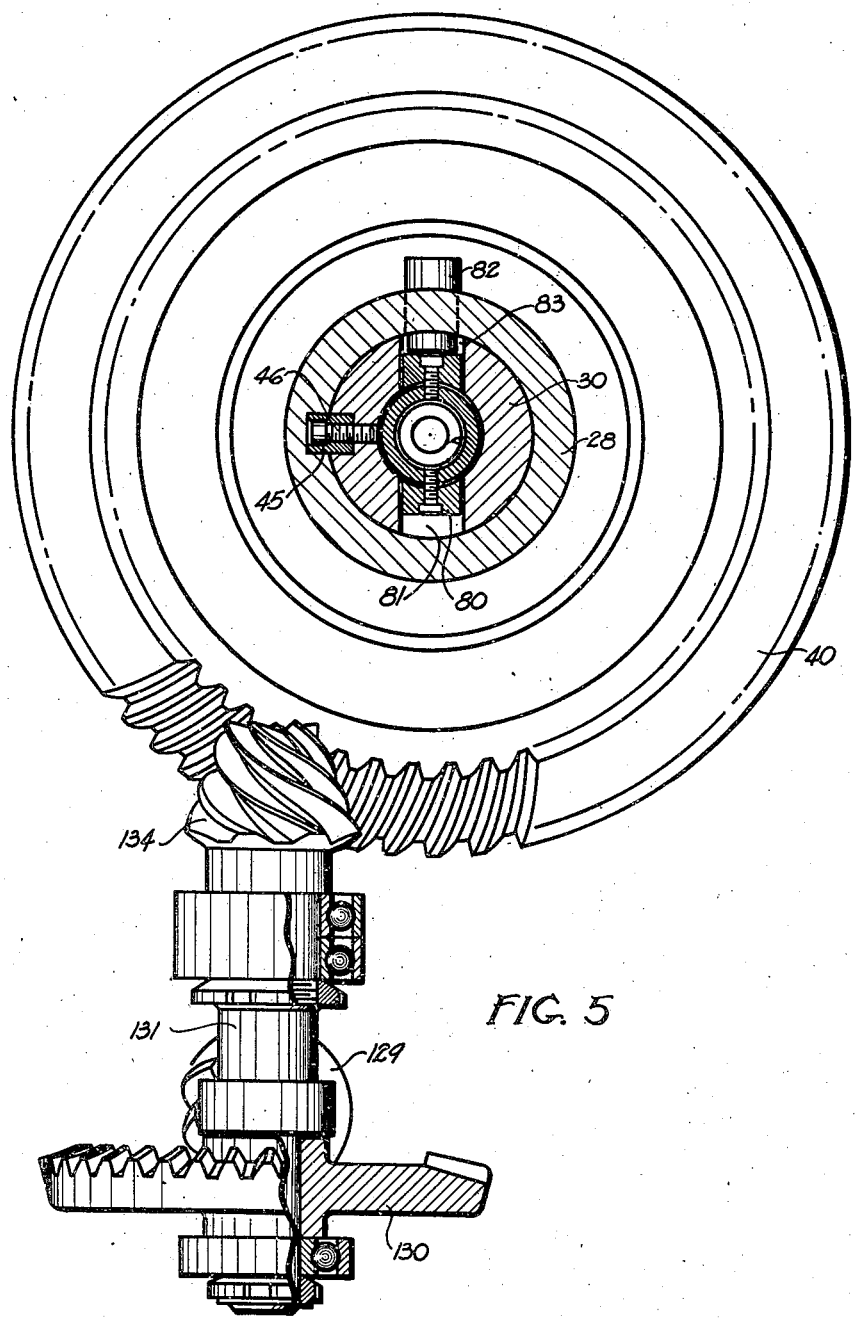
Fig. 5 is a transverse sectional view through the work head, showing the drive to the work spindle and its supporting sleeve.
Figure 10:
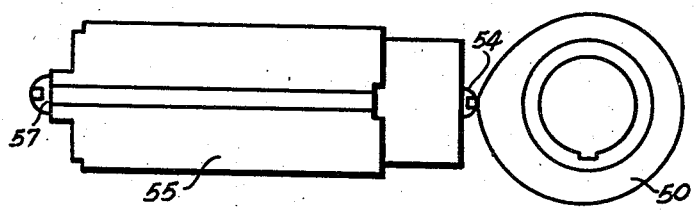
Fig. 10 is a fragmentary plan view showing the disc type relieving cam used on the machine and the follower which engages this cam.
Figure 11:
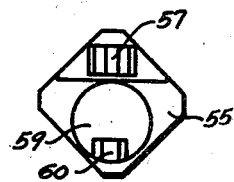
Fig. 11 is an elevational view of the front end of this follower.

The axial reciprocatory movement of the work spindle 30 is effected through operation of the relieving cam 50 (Figs. 4 and 10). This cam is keyed to a shaft 51 that is journaled on suitable bearings in the work head and that is driven by a bevel gear 52 which is fastened to its lower end. The cam 50 engages with a hardened block 54 that is secured in a follower member 55 (Figs. 4, 10, and 11). The follower member 55 is of general diamond shape in cross section and is mounted to slide in a correspondingly shaped hole formed in a guide block 56 which is removably secured to the work head 21. At its forward end, the follower member 55 is provided with a hardened contact portion 57. It is also provided with a cylindrical hole which is adapted to receive the stem portion 58 of a rotatably adjustable follower member 59 that is provided with a hardened contact portion 60.

There are three generally ring-shaped face members secured to the rear end of the work spindle 30. These members are concentric with one another and with the axis of the work spindle and are denoted at 65, 66, and 67, respectively. The contact portion 57 of follower member 55 is adapted to engage face member 67 and the contact portion 60 of follower member 59 is adapted to be engaged with either face member 66 or face member 65. In the position shown in Fig. 4, it is in engagement with face member 65, but by rotatably adjusting it through an angle of 180 degrees from this position, it can be brought into engagement with face member 66. The contact portion 60 of the follower member 59 projects slightly forward of the contact portion 57 of follower member 55 so that when contact member 59 is in engagement with either face member 66 or face member 65, contact member 57 will be out of engagement with face member 67. To engage the contact member 57 with the face member 67, the follower member 59 is removed from follower member 55. To do this, the supporting block 56 must be taken out of the work head. This can be done readily by lifting cover-plate 68 off of the work head 21.

Each of the cam members 65 and 66 is secured by screws or other suitable means to a plate 70, and the cam member 67 is secured by a screw 71 to a plate 72 which in turn is secured by screws to the plate 70. The plate 70 is fastened by screws or other suitable means (not shown) to the end face of the work spindle 30.

The face members 65, 66, and 67 are held in contact with the contact members 57 and 60, as the case may be, and the contact member 54 is held in engagement with the cam 50 through operation of an elongated coil spring 75 which is mounted coaxially of the work spindle 30 and centrally thereof so that it exerts a direct pressure on the contact members and cam. This spring seats at one end against a sleeve member 76 which is threaded into the central bore of the work spindle 30, and at its other end against the closed end of a tube 77 which is fastened by screws 78 and dowel pins 79 to upper and lower blocks 80 (Figs. 4 and 5) that slide in a transverse slot 81 formed in the work spindle 30. The forward movement of the tube 77 is limited by a pin 82 which engages in a slot 83 formed in one of the blocks 80 and which is secured to the sleeve 28 by a screw 84. Because the tube 77 and blocks 80 are free to move in the slot 81, the power, which the coil spring 75 exerts on the contact members and cam, is substantially the same in all axial positions of the work spindle. Moreover, since the coil spring is centrally mounted in the bore of the work spindle, it will exert a direct thrust without any tendency to cant the work spindle. These features aid materially in increasing the accuracy of the machine.

From the preceding description, it will be obvious that as the cam 50 is rotated on its axis, the work spindle 30 is reciprocated axially, and that the extent of each reciprocation will depend not only on the shape of cam 50 but also on the shape of the face member 65, 66, or 67 which is in engagement with follower member 55 or 59 at the given time. The cam 50 is formed, as already stated, in the usual manner, to produce a slow forward movement at a uniform velocity of the work spindle and a quick return movement thereof and is intended to be so rotated in time with the rotation of the work spindle that during a revolution, the work spindle will be reciprocated as many times as there are blades to be relieved.

Figure 9:
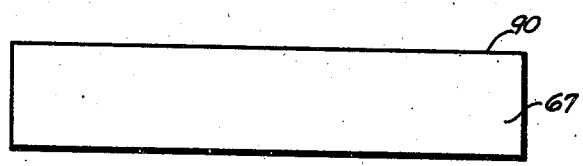
Fig. 9 is a developed view of the face plate used on the machine when grinding a standard type face-mill gear cutter.

The face member 67 as shown in Fig. 9 is a simple ring with a plane active surface 90, which is perpendicular to the axis of the work spindle. When this member 67 is in operation, therefore, the only axial motion imparted to the work spindle is that due to the shape of cam 50 itself. The plate 67 is used when it is desired to relieve blades which are all of the same height and which are arranged at uniform radial distances from the axis of the cutter, in other words, standard face mill gear cutters.

The face members 6 is used when it is desired to relieve blades that are of different heights. This member is provided with a series of steps 91, 92, 93, 94, and 95 and operates to advance the cutter spindle progressively so that successive groups of blades of the cutter are relieved with the cutter in progressively different axial positions. This cam is used when relief-grinding the top of blades of a cutter of the type disclosed in the patent to Slayton, No. 2,252,044, issued August 12, 1941. For relief-grinding the top of the blades, one of the wheels used in grinding the sides of the blades may be employed, but preferably a separate wheel will be used for this purpose as shown in the Gleason Patent No. 1,285,124, issued November 19, 1918. Such a wheel has not been shown in the present application because its use is well known in the art.

The face member 65 is provided with a series of steps 100, which are displaced progressively from one another along the axis of the cam, and with a rise portion 101 which connects the first and last of these steps. This cam is used when it is desired to grind the side surfaces of blades which are progressively displaced from one another radially of the axis of the cutter, such as is the case with the blades of a "Single Cycle" face-mill gear cutter of the type shown in the Slayton patent above mentioned. The operation of a face cam of the type shown at 65 in conjunction with a standard relieving cam of the type shown at 50 is described in detail in the Johanson Patent No. 2,188,005, issued January 23, 1940.

Figure 6:
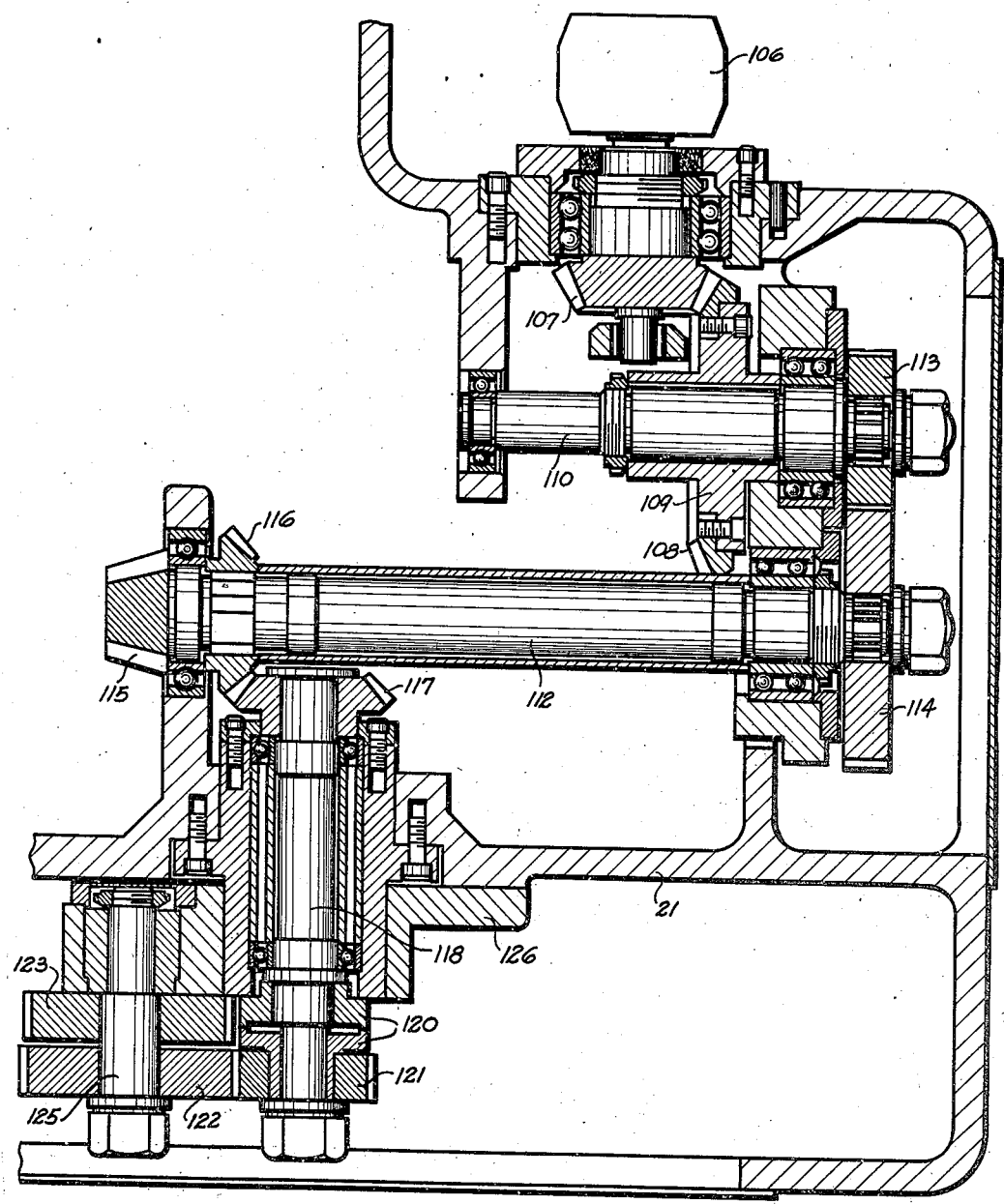
Fig. 6 is a detail sectional view through the work head, taken in a plane at right angles to the plane of Fig. 4, and showing certain details of the drive to the work spindle and relieving cam.
Figure 7:
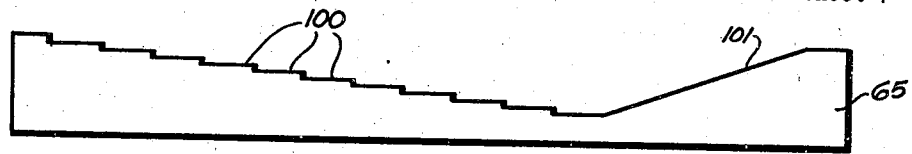
Fig. 7 is a developed view of a face cam such as may be employed on the machine when relieving the side surfaces of blades of a "Single Cycle" type face-mill gear cutter.
Figure 8:
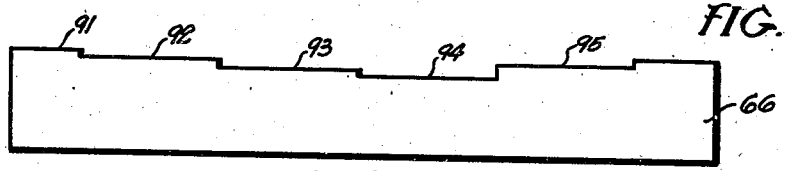
Fig. 8 is a developed view of a face cam such as may be employed on the machine when grinding the tops of the blades of such a cutter.

The work spindle 30 and the cam 50 are driven in time with one another from a motor 105 (Figs. 1 and 14) which is mounted on the base of the machine and which is connected by means of a standard coupling 106 with a bevel pinion 107 (Figs. 6 and 14). The pinion 107 meshes with a bevel gear 108. This gear 108 is secured to a sleeve member 109 that is keyed to a shaft 110 which is journaled on anti-friction bearings in the work head 21. The shaft 110 drives a parallel shaft 112 through spur change gears 113 and 114 which are splined to the shafts 110 and 112, respectively. Shaft 112 is also journaled in the work head 21 and it is provided at its inner end with a bevel pinion 115 that meshes with and drives the bevel gear 52 (Figs. 4 and 14) which is secured to the shaft 51 on which the relieving cam 50 is mounted. Mounted on the shaft 112 and having a splined connection therewith is a bevel pinion 116. This pinion meshes with a bevel gear 117 which is keyed to a shaft 118 that is journaled in the work head 21. The shaft 118 is connected by cooperating face clutch members 120 with a spur gear 121. This spur gear forms one of a set of change gears of which the other members are denoted at 122, 123, and 124, respectively. The spur gears 122 and 123 are mounted on a stud 125 (Figs. 4, 6, and 14) which is secured in a quadrant 126 that is fastened by the bolt 127 to the work head 21. The change gear 124 is keyed to a shaft 128 which carries a bevel pinion 129 at its inner end. This pinion meshes with a bevel gear 130 that has a splined connection with a shaft 131 which is journaled in a block 132 that is fastened to the bracket 24. This shaft is provided at its upper end with a hypoid pinion 134 which meshes with the hypoid gear 40 to drive the work spindle 30.

The hypoid gear for the work spindle and the bevel gear drive to the relieving cam 50 permit of driving both these parts smoothly yet at high speed, and as a result the speed of the whole gear train can be increased as compared with similar drives in face-mill relieving grinders heretofore built. This minimizes the possibility of any errors in the gears of the train affecting the accuracy of the relieving operation.

The structure which has thus far been described in detail constitutes the mounting for the work, namely, for the cutter which is to be relieved, and provides means for rotating the cutter continuously on its axis and for moving the cutter axially during its rotation. The grinding wheels, as already stated, are mounted on a slide 22. The manner in which they are supported and their adjustments will now be described.

Figure 3:
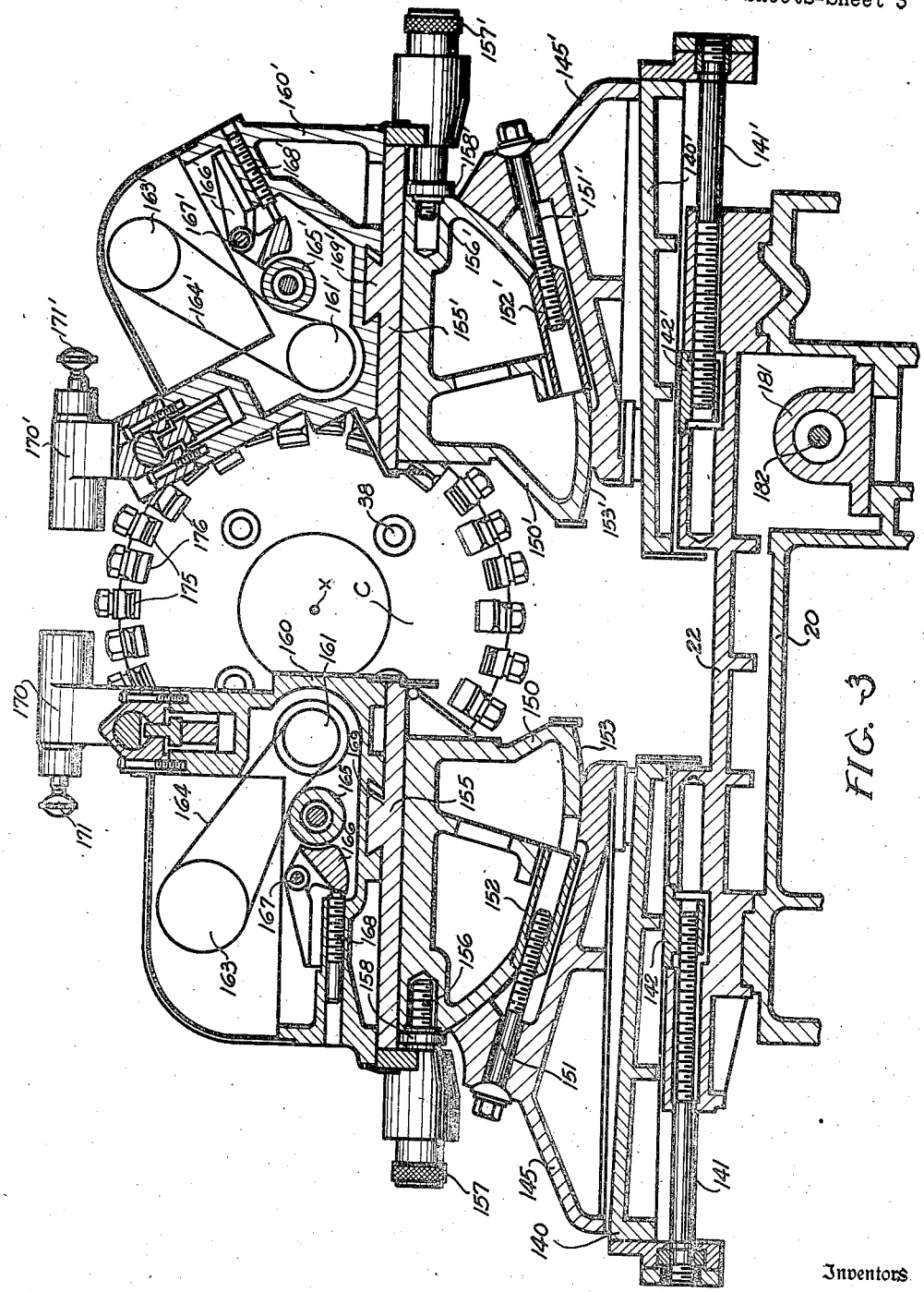
Fig. 3 is a transverse sectional view through the grinding wheel heads and their supports, looking at the work end of the machine.

The slide 22 carries two aligned slides 140 and 140' (Figs. 1 and 3). These are mounted on the slide 22 for rectilinear adjustment thereon in a direction at right angles to the direction of movement of the slide 22, that is, in a direction at right angles to the axis $x$ of the work spindle. The slides 140 and 140' are adjusted on the slide 22 by rotation of the screw shafts 141 and 141', respectively, which are journaled in the slides 140 and 140', respectively, and which thread into nuts 142 and 142', respectively, that are secured to the slide 22. Graduated scales 143 and 143' (Fig. 1) are provided to permit making these adjustments precisely.

Mounted on the slides 140 and 140', respectively, for angular adjustment thereon are the plates 145 and 145', respectively. These plates are adjusted angularly about studs, such as stud 146' shown in Fig. 2, which are journaled in the slides 140 and 140', respectively. The studs extend at right angles to the direction of the axis $x$ of the work spindle and the angular adjustment of the plates 145 and 145' is therefore about axes extending at right angles to the axis of the work spindle. These adjustments are effected by rotation of the worm shafts 147 and 147' (Fig. 1) which are journaled in the slides 140 and 140', respectively, and which engage with gear segments (not shown) that are secured to or are integral with the plates 145 and 145', respectively. The plates 145 and 145' are suitably graduated to permit the angular adjustments thereof to be made precisely.

Mounted on the plates 145 and 145' for angular adjustment thereon about axes which lie preferably in the same horizontal plane with and which extend in the same direction as the axis $x$ of the work spindle are rocker members 150 and 150', respectively. The rocker members are provided with arcuate guide surfaces 153 and 153', respectively, which are concentric with the axes of adjustment of the rocker members, respectively, and which rest upon curved guide surfaces formed on the upper surfaces of the plates 145 and 145', respectively, also concentric with the axes about which the rocker members are adjustable. Adjustments of the rocker members 150 and 150' are effected by rotation of the screw shafts 151 and 151', respectively, which are journaled in the plates 145 and 145', respectively, and which thread into the nuts 152 and 152', respectively, which are secured in the rocker members.

Mounted on the rocker members for rectilinear adjustment thereon are the plates 155 and 155', respectively. These plates are adjusted by rotation of screw shafts 156 and 156', respectively, which are operated by the knurled knobs 157 and 157', respectively, and which are journaled in the plates 155 and 155', respectively, and which thread into nuts 158 and 158' that are secured to the rocker members 150 and 150', respectively.

Mounted on the plates 155 and 155', respectively, for rectilinear adjustment thereon in directions at right angles to the directions of adjustment of the plates, respectively, are the grinding wheel heads 160 and 160', respectively. Dovetail guides 169 and 169', respectively, guide the heads in these adjustments.

Journaled in the grinding wheel heads are the spindles 161 and 161' to which the grinding wheels W and W', respectively, are secured. The grinding wheel spindles are driven by motors which are mounted on the wheel heads, one of which is shown at 162' in Fig. 2. These motors drive the grinding wheel spindles through pulleys 163 and 163', respectively, and belts 164 and 164', respectively. The pulleys 163 and 163' are connected to the armature shafts of the motors. Belt tighteners of standard type are provided to take up slackness in the belt drives. These comprise rollers 165 and 165', respectively, which are journaled in arms 166 and 166', respectively, in the wheel head. These arms are adjustable about pivots 167 and 167', respectively, by manipulation of the threaded rods 168 and 168', respectively, which thread into the grinding wheel heads 169 and 169', respectively, and which engage the arms 166 and 166', respectively.

On each of the grinding wheel heads is mounted the mechanism for dressing the grinding wheel. This mechanism may be of any suitable structure, as for instance, of the type shown in the pending application of Magnus H. Johanson, Serial No. 508,938, filed November 4, 1943, and need not be further described here. The dressing devices may be operated hydraulically through actuation of manually operable valves that are mounted in the valve casings 170 and 170', respectively, and that are actuated by the push handles 171 and 171', respectively.

The cutter C to be relieved, which is shown in Fig. 3, is of the standard face-mill type and is provided with alternate outside and inside cutting blades 175 and 176. Ordinarily the inside blades of such a cutter are removed while the outside blades are being relieved, as shown in Fig. 1, and vice versa. This is in order to insure that the grinding wheels may clear the succeeding blades of the cutter on each return stroke of the work spindle.

As already stated, two of the primary features of the present invention are the mounting of the grinding wheels so that the lines of contact of the wheels with the side surfaces of the blades to be ground will lie in the same plane with the axis of the work, and the adjustment of the grinding wheels along the normals to the profiles of the blades so that the lines of contact will remain in this plane regardless of the diameters of the wheels. The advantages attained by these features will be clear from comparison of Figs. 12 and 13. Ordinarily, face-mill gear cutters have an even number of cutting blades, and therefore diametrically opposite blades are either both outside blades or both inside blades. But in Figs. 12 and 13 for purposes of illustration and to explain more readily the principles of this invention, an inside and an outside blade have been shown diametrically opposite one another.

Figure 12:
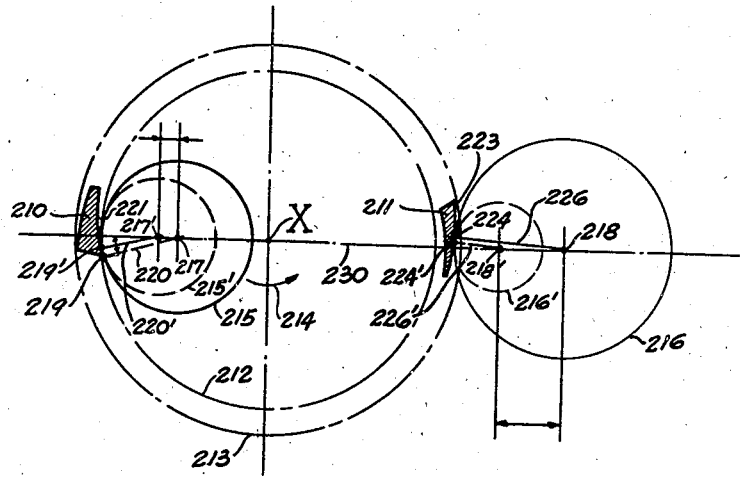
Fig. 12 is a diagrammatic view illustrating the principle of operation of the conventional type of face-mill gear cutter relieving-grinder.
Figure 13:
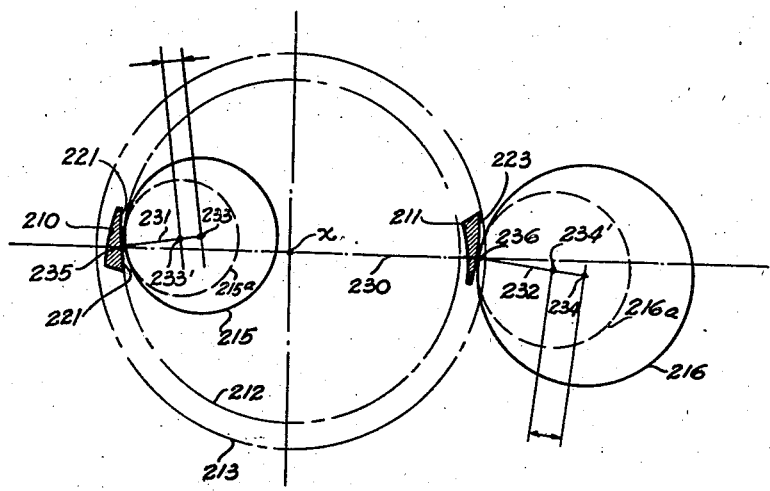
Fig. 13 is a diagrammatic view illustrating the principle of operation of the new machine of the present invention.

Fig. 12 illustrates diagrammatically the structure and principle of operation of the conventional type of face-mill relieving grinder heretofore used. Here 210 and 211 denote, respectively, an inside and an outside blade of a face-mill gear cutter which is to be relieved. The axis of this cutter is at X perpendicular to the plane of the drawing and the circles in which radially equidistant points of the outside and inside cutting edges, respectively, of the cutter lie, are denoted at 212 and 213, respectively. 215 and 216, respectively, denote two grinding wheels for grinding the inside and outside surfaces, respectively, of the blades. In the conventional machines, the grinding wheels are positioned so that their axes 217 and 218, respectively, lie in the same plane with the axis X of the work but are inclined to the axis X of the work in accordance with the pressure angles of the side surfaces to be ground. The points of contact between the grinding wheels and the side surfaces of the blades lie, of course, on normals drawn from the centers of the wheels to the relieved side surfaces 221 and 223, respectively, of the blades. These surfaces are helical surfaces which are inclined to the circles 212 and 213. A normal drawn from the center 217 of the grinding wheel 215 to the inside surface 221 of the blade 210 intersects the side of the blade at point 219 which is, therefore, a point of contact of the wheel with the inside surface 221 of the blade. Likewise, a normal drawn from the axis 218 of the grinding wheel 216 to the relieved outside surface 223 of the blade 211 intersects the blade surface in point 224 which is, therefore, a point of contact of the wheel 216 and blade surface 223. For a cutter having the direction of rotation indicated by arrow 214, then, the point 219 of contact of the wheel 215 with the inside surfaces 221 of the blades is below the horizontal plane 230 containing the wheel and work axes 217, 218, and X, while the point 224 of contact for the outside surfaces is above that plane. It will be obvious, therefore, that the rotary and axial movements about and along the work axis X will have to be timed differently when grinding the inside and outside surfaces, respectively, of the blades, if the wheels are to grind the side surfaces of each blade for its full length from front to rear without danger of striking the next blade of the cutter.

Now in the conventional machine and method the grinding wheels are adjusted radially of the work axis in the horizontal plane 230 to compensate for wheel wear. 215' and 216' (Fig. 12) denote positions of the grinding wheels after they have been used for a considerable length of time and are considerably reduced in diameter from their original dimensions. The wheels have had to be adjusted radially of the axis X of the work in order to maintain them in operative relation with the work, and the axes of the two wheels are now at 217' and 218', respectively. With the changes in radial positions and diameters of the wheels, the points of contact between the wheels and the side surfaces of the blades have also shifted. Thus for a wheel of the diameter 215', the point of contact between the wheel and the inside surface of the blade 210 is at 219' on the normal 220' passing through the new position 217' of the axis of the wheel. Likewise, the point of contact for the outside surfaces of the blades has shifted to 224' on the normal 226' which passes through the new position 218' of the axis of the wheel. It can readily be demonstrated that if the grinding wheel in its new position 215' is adjusted to the same angular inclination to the axis of the work as in its initial position 215, it will not produce exactly the same pressure angle on the inside surfaces of the blades as when new. Likewise, if the grinding wheel in its position 216' is inclined at the same angle to the work as in its original position 216, it will not produce the same pressure angle on the outside surfaces of the cutter blades as when new. With the conventional machine and method, then, it is required to change the inclination of the grinding wheel axes to the work axis when the radial positions and diameters of the grinding wheels are changed. Moreover, for the reasons already given, it is required to change the timing of the relative rotational and axial movements about and along the axis of the work, when the wheel dimension is materially changed.

With the present invention, change in timing is not required with reduction in diameter of the wheel nor is change in pressure angle position necessary. Moreover, both inside and outside surfaces of the blades can be ground with the same timing and, if desired, simultaneously. This is illustrated diagrammatically in Fig. 13. Here again, the blades of the cutter to be ground may be denoted at 210 and 211. The axis of the work is designated at $x$ while the circles 212 and 213 denote the paths of radially equidistant points in the inside and outside surfaces, respectively, of the blades as the cutter revolves on its axis. The inside grinding wheel is again denoted at 215 and the outside grinding wheel at 216. The axis $X$ of the work is again perpendicular to the plane of the drawing and the axes 233 and 234 of the wheels are again inclined to the work axis and to the plane of the drawing in accordance with the pressure angles of the side surfaces to be relieved. With the present invention, however, the wheels are so positioned that their axes lie above and below the horizontal plane 230 which contains the work axis. The wheels are so positioned that the lines of contact between the grinding wheels and the opposite side surfaces of the blades lie in the plane 230. These positions are attained by tilting the rocker members 150 and 150', respectively (Fig. 3), to the normal relief angles of the inside and outside surfaces, respectively, of the blades, that is, the wheels are so positioned that the normals 231 and 232 to the inside and outside relieved surfaces 221 and 223, respectively, of the blades intersect the horizontal plane 230 in the points of contact 235 and 236, respectively, of the grinding wheels with the opposite side surfaces of the blades. Since the wheels contact with the inside and outside surfaces of the blades in the same plane, the same timing can be employed between relative rotary and axial movements of the work in the grinding of both inside and outside surfaces of the blades. Hence, both inside and outside surfaces of the blades can be ground simultaneously for their full lengths without danger that, during the grinding of one blade, the wheel may strike the next blade.

Now, as the grinding wheels decrease in diameter, they are adjusted, according to the principles of the present invention, along the normals to the blade profiles. Thus, when the wheel 215 is reduced to the diameter 215a, it will be adjusted along the normal 231 so that its axis will be at 233', but the point of contact between the wheel and the profile of the inside surface of the blade 210 will remain in the plane 230. The same is true of the outside surface of the blade. 216a denotes a position of the outside grinding wheel after it has been reduced in diameter and 234' is the new position to which the axis of the wheel has been adjusted along the normal 232. The point 236 is still the point of contact between the wheel and the outside surfaces of the blades. Hence, with the present invention, no change in timing and no change in pressure angle adjustment is required in order to grind the same surface on a blade when the wheel is old as when it is new. The present invention not only saves time, but avoids two possible sources of error, namely, failure to properly readjust the pressure angle settings, and failure to properly change the timing.

Referring back to the machine structure and particularly to Figs. 1 and 3, it will be seen, then, that the adjustments of the grinding wheel heads 160 and 160' on the plates 155 and 155', respectively, permit of positioning the grinding wheels in accordance with the height of the side surfaces of the blades to be ground, while adjustments of the plates 155 and 155', respectively, on the rocker members 150 and 150' permit of positioning the grinding wheels so that they will have the proper radial distance from the axis $x$ of the work spindle to engage the outside and inside surfaces of the blades, respectively. The latter adjustments depend, of course, on diameter of the cutter, on the point widths of the blades, and on the diameters of the grinding wheels. The adjustments of the rocker members 150 and 150' permit, as already described, of adjusting the grinding wheels so that the lines of contact of the wheels with the side surfaces of the blades may lie in the horizontal plane of the machine containing the axis $x$ of the work spindle. The angular adjustments of the plates 145 and 145' on the slides 140 and 140', respectively, permit of inclining the axes of the grinding wheels to the axis of the work spindle, as shown clearly in Fig. 1, in order to grind side surfaces of the required pressure angles on the blades. The rectilinear adjustments of the slides 140 and 140', respectively, on the slide 22 permit of maintaining the axes of the rocker members 150 and 150', respectively, so that they pass through the desired lines of contact throughout the lives of the grinding wheels.

After a cutter has been ground, it may be removed from the machine and a new cutter put on by withdrawing the grinding wheels from operating to loading position. This is accomplished by movement of the slide 22. This slide is movable by operation of the piston 180 (Fig. 2) which is adapted to reciprocate in a cylinder 181 secured in the base of the machine. There is a piston-rod 182 integral with or connected to the piston 180. This piston-rod projects through one end wall of the cylinder 181 and is threaded to engage a nut 183 that is secured to the slide 22.

The direction of movement of the piston 180 is controlled by a standard reversing valve 185 which slides in a ported sleeve 186 that is mounted in a valve casing 187 which is secured at one side of the work head of the machine. The pressure fluid is supplied to the valve casing 187 through a pipe 188 which may be connected to any suitable source of pressure supply.

Figure 2:
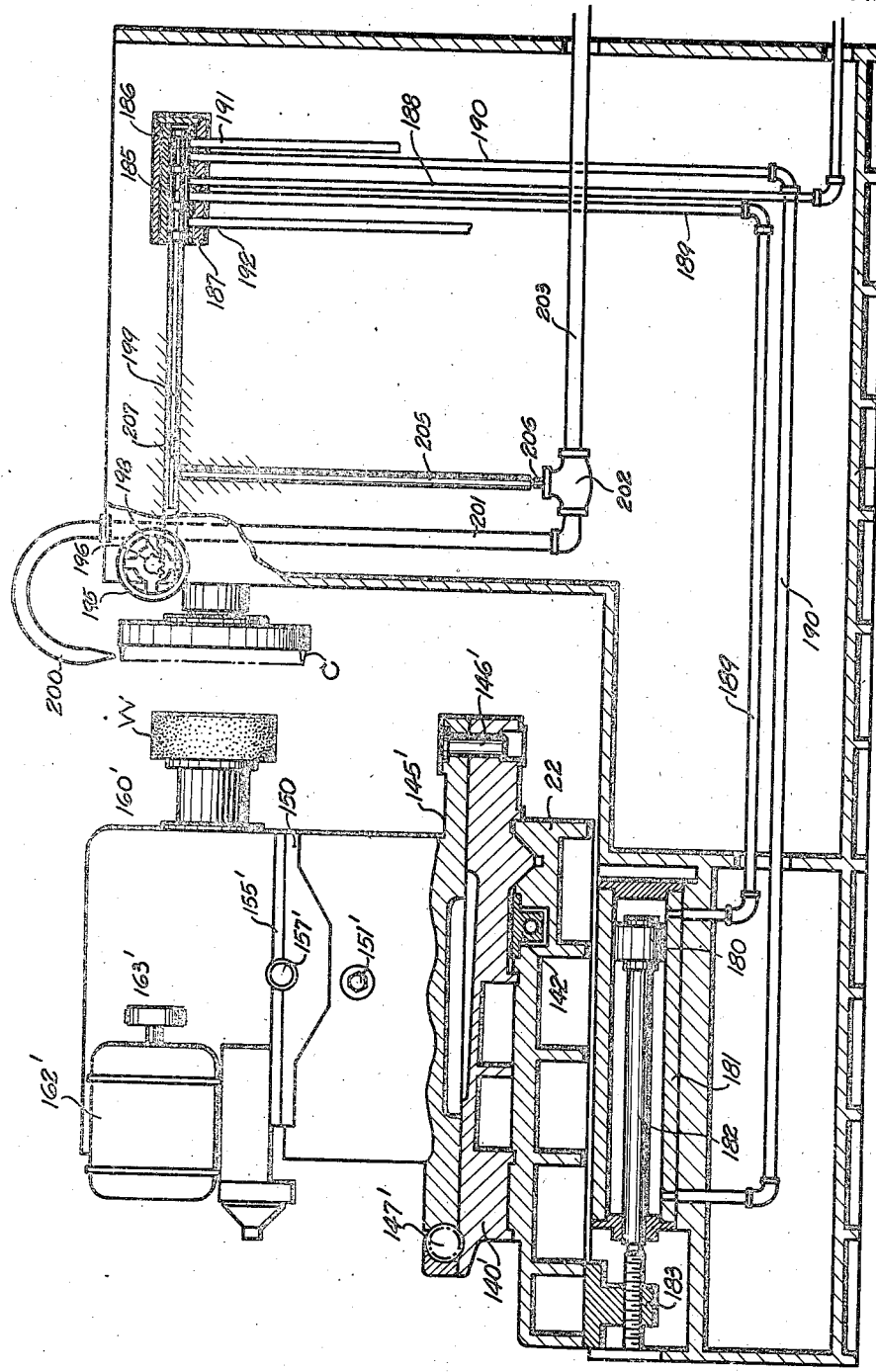
Fig. 2 is a somewhat diagrammatic vertical sectional view through the machine, showing particularly the hydraulic and coolant systems of the machine.

In the position shown in Fig. 2, the duct 189 which leads to the right hand end of the cylinder 181 is on supply and the duct 190 which leads to the left hand end of this cylinder is on exhaust through the pipe 191 which leads back to the sump of the machine. In this position, the piston 180 is forced to the left in the cylinder 181 to withdraw the grinding wheels from operative position. When the valve is shifted, the line 190 is put on supply from the line 188 and the line 189 is put on exhaust through the pipe 192 which leads back to the sump.

The valve 185 may be shifted by rotation of the hand wheel 195 which is secured to a shaft 196 that is journaled in the work head. This shaft has a spur pinion formed on it which engages with a rack 198. This rack is integral with a rod 199 that is secured to or integral with the valve 185. Rotation of the hand wheel 195 will, therefore, reciprocate the rod 199 and thereby shift valve 185.

Rotation of the hand wheel 195 also operates to control the flow of the coolant to the cutter. The coolant is supplied to the cutter through a nozzle or nozzles 200 which is or are connected with a pipe 201 that in turn is connected through a valve 202 with a supply line 203. The valve 202 is a standard valve and is normally spring pressed closed. It is adapted to be opened, however, by depressing the rod 205 which is mounted reciprocably in the work head and which engages at one end with the valve stem 206 and at its opposite end with the rod 199. The rod 199 has a collar portion 207 of enlarged diameter formed on it at a suitable point along its length. When the rod 199 is in position shown in Fig. 2, the spring of valve 202 forces the rod 205 upwardly and closes the valve 202, shutting off the flow of the coolant to the cutter. When the rod 199 is shifted to the left to move the grinding wheels to operative position, the collar 207 rides onto the tip of the rod 205, this rod is depressed, and the valve 202 is opened to allow flow of the coolant to the cutter. Thus it will be seen that on withdrawal of the grinding wheels to inoperative position, the coolant supply is shut off and on return of the grinding wheels to operative position, the coolant supply is turned on.

The grinding wheels W and W' shown in the drawings are cylindrical wheels and have active side surfaces of straight profile shape. It will be understood, however, that the invention has broad application and that wheels of other profile shape may be employed as determined by the profile shape desired to be ground on the side surfaces of the blades being relieved.

Moreover, it will be understood that the machine of this invention may be employed for relieving face-mill cutter blades having side surfaces of different helicoidal forms. Thus, the adjustment of the rocker members 150 and 150' makes the present machine especially suited to the relief-grinding of face-mill gear cutter blades with involute helicoidal side surfaces according to the process of the patent of Allan H. Candee and Ernest Wildhaber, No. 2,186,362, issued January 9, 1940. For such purpose, the rocker members are adjusted so that the lines of contact between the grinding wheels and the side surfaces of the blades will be offset from the horizontal plane containing the axis of the work spindle, according to the principles disclosed in said patent. With the present invention, it is possible to grind inside and outside surfaces of such blades simultaneously because the mean points of contact between the wheels and opposite sides of the blades can be made to lie in the same plane with the work axis. Where the mean points of contact are offset from that plane, only one side of the blades can be ground at a time for then the danger of hitting one blade, while grinding another, is even greater than when grinding blades having conventional helical relief.

Further, while the invention has been described in connection with a machine for relieving face-mill gear cutters, there are certain features of the invention which may be employed on tool-relieving machines of other types, as for instance, the mounting of the work spindle, and the spring arrangement for holding the work spindle in operative relation with the relieving cam. Moreover, while the invention has been described in connection with the relief-grinding of cutting tools, it will be understood that it may be applied also to the relieving of such tools in milling or other cutting operations. It will further be understood that while a particular embodiment of the invention has been described, the invention is capable of various other modifications. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention what we claim is:

1. The method of relieving side surfaces of blades of a face-mill gear cutter in which a rotary relieving tool is employed, the tool axis is inclined to the cutter axis in accordance with the pressure angle of the side surfaces to be relieved, and a normal at a point of contact of the tool and work is inclined to a plane containing said point of contact and the work axis, a relative helical motion is effected between the cutter and the tool about the cutter axis as the tool rotates in engagement with the side surfaces of the blade, and, as the tool diameter decreases due to wear, the tool is adjusted relative to the cutter along the normal to maintain the tool in operative relation with the work.

2. The method of relieving side surfaces of blades of a face-mill gear cutter which comprises adjusting two grinding wheels, which are adapted to grind opposite side surfaces of the blades, respectively, into engagement with opposite side surfaces of blades of the cutter so that the line of contact between each wheel and a blade profile lies in the same plane as the cutter axis, and grinding each side surface of the blades by rotating the corresponding wheel in engagement with the blades while effecting a relative helical motion between the wheel and cutter about the cutter axis.

3. The method of relieving side surfaces of blades of a face-mill gear cutter which comprises adjusting two grinding wheels, which are adapted to grind opposite side surfaces of the blades, respectively, into engagement with opposite side surfaces of the blades so that the lines of contact between the wheels and the blade profiles lie in the same plane as the cutter axis, and rotating the two wheels simultaneously in engagement with the cutter while rotating the cutter on its axis and simultaneously effecting a relative reciprocating movement between the wheels and cutter in the direction of the cutter axis and in time with the cutter rotation.

4. In a machine for relieving side surfaces of blades of face-mill gear cutters, a work support, a tool support, a work spindle journaled in the work support with its axis horizontal, a tool rotatably mounted on the tool support with its axis horizontal, means for adjusting the tool support about a horizontal axis offset from and parallel to the axis of the tool means for adjusting the tool support about a vertical axis lying in a plane perpendicular to a plane containing the axis of the work spindle, means for adjusting the tool support in a direction at right angles to the axis of the work spindle, means for rotating the tool, means for rotating the work spindle, and means for effecting a relative reciprocatory movement between the tool and work spindle axially of the work spindle in time with the rotation of the work spindle.

5. In a machine for relieving side surfaces of blades of face-mill gear cutters, a work support, a tool support, a work spindle journaled in the work support, a tool rotatably mounted on the tool support, means for adjusting the tool support angularly about an axis offset from the axis of the tool, means for adjusting the tool support about an axis lying in a plane perpendicular to a plane containing the axis of the work spindle, means for adjusting the tool support relative to the work support in a direction perpendicular to the axis of the work spindle, means for rotating the tool, means for rotating the work spindle, and means for producing a relative helical motion between the tool and work spindle axially of the work spindle in time with the rotation of the work spindle.

6. In a machine for relieving side surfaces of blades of face-mill gear cutter, a base, a work support secured to the base, a work spindle journaled in the work support, a tool support mounted on the base for adjustment in a direction at right angles to the axis of the work spindle, a plate adjustably mounted on the tool support for adjustment angularly about an axis extending at right angles to the axis of the work spindle, a rocker member adjustably mounted on plate for adjustment about an axis extending at right angles to the axis of adjustment of the plate, a tool head mounted on a rocker member for adjustment radially of the axis of adjustment of the rocker member, a grinding wheel journaled in the tool head with its axis extending in the direction of the axis of adjustment of the rocker member, means for rotating the grinding wheel, means for rotating the work spindle, and means for effecting a relative reciprocatory movement between the tool and work supports in a direction axial of the work spindle and in time with the rotation of the work spindle.

7. In a relieving machine, a work support, a sleeve journaled in the work support, a work spindle mounted in the sleeve for axial movement therein but connected to the sleeve to rotate therewith, a rotary cam operatively connected to the work spindle for effecting axial reciprocation of the work spindle, said spindle having a bore formed centrally therein, a coil spring mounted in said bore and operable to maintain the spindle in operative engagement with the cam, means for rotating the sleeve, and means for rotating the cam in timed relation with the rotation of the sleeve.

8. In a relieving machine, a work support, a sleeve journaled in the work support on a pair of spaced anti-friction bearings, a work spindle mounted in the work support on a pair of spaced anti-friction bearings for axial movement in the sleeve, the last named pair of bearings being spaced further apart than the first named pair of bearings, a rotary cam operatively connected to the work spindle for effecting axial movement of the spindle in the sleeve, said spindle having a central bore, a coil spring mounted in said bore and operable to maintain the spindle in operative relation with the cam, and means for rotating the sleeve and cam in timed relation.

9. In a relieving machine, a work support, a sleeve journaled in the work support, a work spindle mounted in the sleeve for axial movement therein, means connecting the sleeve and spindle to rotate together, a rotary cam operatively connected to the work spindle to effect axial movement of the spindle, said spindle having a central bore therein, a tube mounted in the bore to be movable axially of the spindle, means connecting the tube to the spindle to rotate therewith but allowing the tube to move axially of the spindle, means limiting said axial movement in one direction, a coil spring mounted in the tube and bearing at one end against the tube and operatively connected at its opposite end to the spindle to maintain the spindle in operative relation with the cam, and means for rotating the sleeve and cam in timed relation.

10. In a relieving machine, a work support, a sleeve journaled in the work support on spaced bearings, a work spindle mounted in the work support on spaced bearings for axial movement in the sleeve, means connecting the spindle to the sleeve to rotate therewith, a rotary cam operatively connected to the spindle to effect axial movement of the spindle in the sleeve, said spindle having a central bore therein, a tube mounted in the bore to be movable axially of the spindle, means connecting the tube to rotate with the spindle, a coil spring mounted in the tube and bearing at one end against the tube and connected at its opposite end to the spindle to maintain the spindle in operative relation with the cam, means connected to the sleeve for limiting the axial movement of the tube in one direction, and means for rotating the sleeve and cam in timed relation.

11. In a machine for relieving blades of a face-mill gear cutter, a work support, a tool support a work spindle mounted in the work support for rotary and axial movement therein, a tool rotatably mounted on the tool support, means for rotating the tool, means for rotating the work spindle, a rotary cam for moving the work spindle axially, a plurality of concentrically disposed face members fixedly secured to the work spindle coaxially thereof and having differently shaped face contours, a follower operatively connected at one end to the first named cam, a second follower operatively connected to the first follower and adjustable thereon to be engaged selectively with the face members, and means for rotating the first cam in time with the rotation of the work spindle.

12. In a machine for relieving blades of a face-mill gear cutter, a work support, a tool support, a work spindle mounted in the work support for rotary and axial movement therein, a tool rotatably mounted on the tool support, a cam rotatably mounted on the work support with its axis at right angles to the axis of the work spindle, a plurality of concentrically disposed face members fixedly secured to the work spindle coaxially thereof and having differently shaped face contours, a follower operatively connected at one end to the cam to move axially of the spindle on rotation of the cam, said follower being formed at its opposite end to cooperate with one of the said face members, a second follower mounted on the first follower and projecting axialy beyond the first follower, said second follower being adjustable angularly on the first follower to be engaged selectively with others of the face members, said second follower being detachable from the first follower to permit the first follower to engage the face member with which the first follower is adapted to cooperate, means for rotating the tool, means for rotating the work spindle, and means for rotating the cam in time with the rotation of the work spindle.

13. In a machine for relieving side surfaces of blades of face-mill gear cutters, a work support, a tool support, a work spindle journaled in the work support with its axis horizontal, a rotary tool journaled in the tool support with its axis horizontal, means for adjusting the tool support about a horizontal axis offset from the axis of the work spindle to position the tool so that a normal at a point of contact between the tool and work extends at an angle to the horizontal plane of the work spindle equal to the normal relief angle of the side surfaces of the blades to be relieved, means for adjusting the tool support about an axis at right angles to the axis of the first named adjustment to incline the active surface of the tool to the axis of the work spindle in accordance with the pressure angle of the side surfaces to be relieved, means for rotating the tool, means for rotating the work spindle, and means for effecting a relative movement between the tool and work spindle axially of the work spindle in time with the rotation of the work spindle.

MAGNUS H. JOHANSON.
ERNEST WILDHABER.